United States Patent [19]
Doran et al.

[11] 3,782,565
[45] Jan. 1, 1974

[54] AUTOMATED HANDLING SYSTEM FOR CONTAINER HELD MATERIAL

[76] Inventors: John T. Doran, 3707 Bradley Ln., Chevy Chase, Md. 20015; John C. Maddock, 1404 Kersey Ln., Rockville, Md. 20854

[22] Filed: Dec. 23, 1971

[21] Appl. No.: 211,337

[52] U.S. Cl............... 214/16.4 A, 187/39, 307/139, 307/116, 214/16.1 DB, 318/603, 318/629
[51] Int. Cl............................................. B65g 1/06
[58] Field of Search............... 214/16.4 A; 307/116; 318/603, 629

[56] References Cited
UNITED STATES PATENTS

| | | | |
|---|---|---|---|
| 3,139,994 | 7/1964 | Chasar | 214/16.4 A |
| 3,219,207 | 11/1965 | Chasar | 214/16.4 A |
| 3,232,455 | 2/1966 | Fountain et al. | 214/16.4 A |
| 3,402,835 | 9/1968 | Saul | 214/16.4 A |
| 3,455,468 | 7/1969 | Saul | 214/16.4 A |
| 3,485,389 | 12/1969 | Armington et al. | 214/16.4 A |
| 3,490,616 | 1/1970 | Castaldi | 214/16.4 A |
| 3,526,326 | 9/1970 | Castaldi | 214/16.4 A |
| 3,677,421 | 7/1972 | Kintner | 214/16.4 A |

Primary Examiner—Gerald M. Forlenza
Assistant Examiner—R. B. Johnson
Attorney—Morris Liss et al.

[57] ABSTRACT

A load bed is moved relative to a rack that stores material placed in containers or pallets. A control unit is provided to guide the bed to a preselected container position and electromagnetic means attached to the bed attracts the container onto the bed. The bed is then returned to an initial station where the container can be retrieved. The reverse process is employed to return the container in the rack. Similarly, fork members can be employed, in lieu of the electromagnetic means, to handle pallets.

2 Claims, 12 Drawing Figures

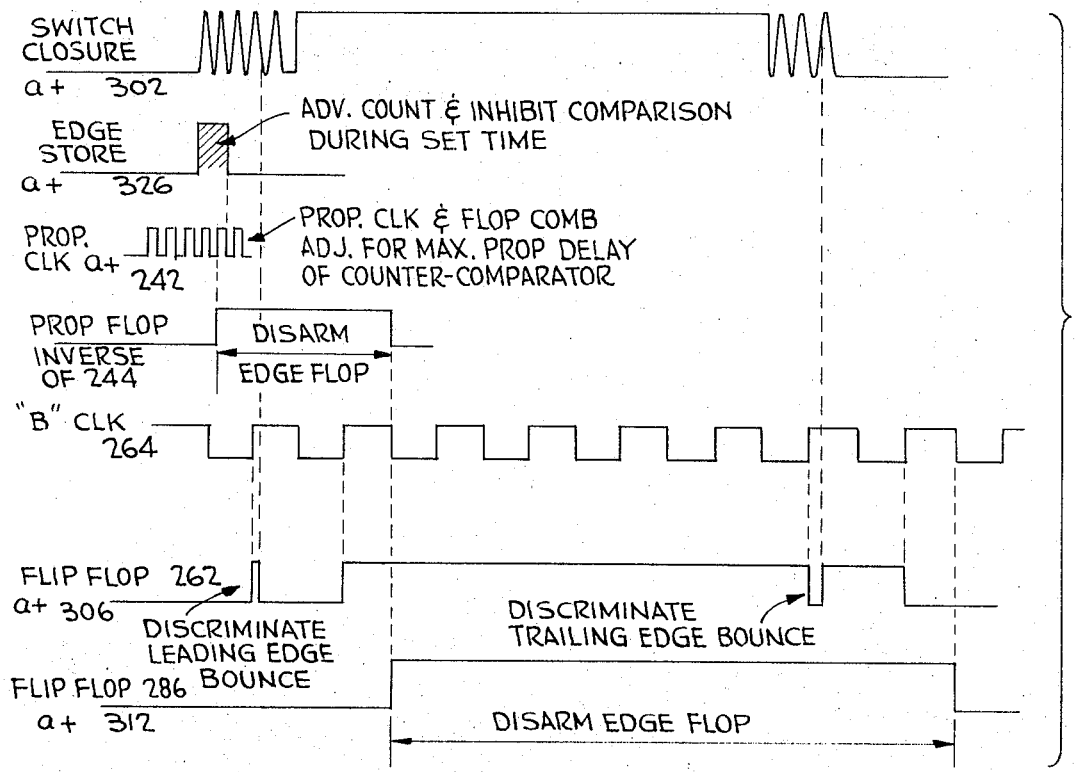
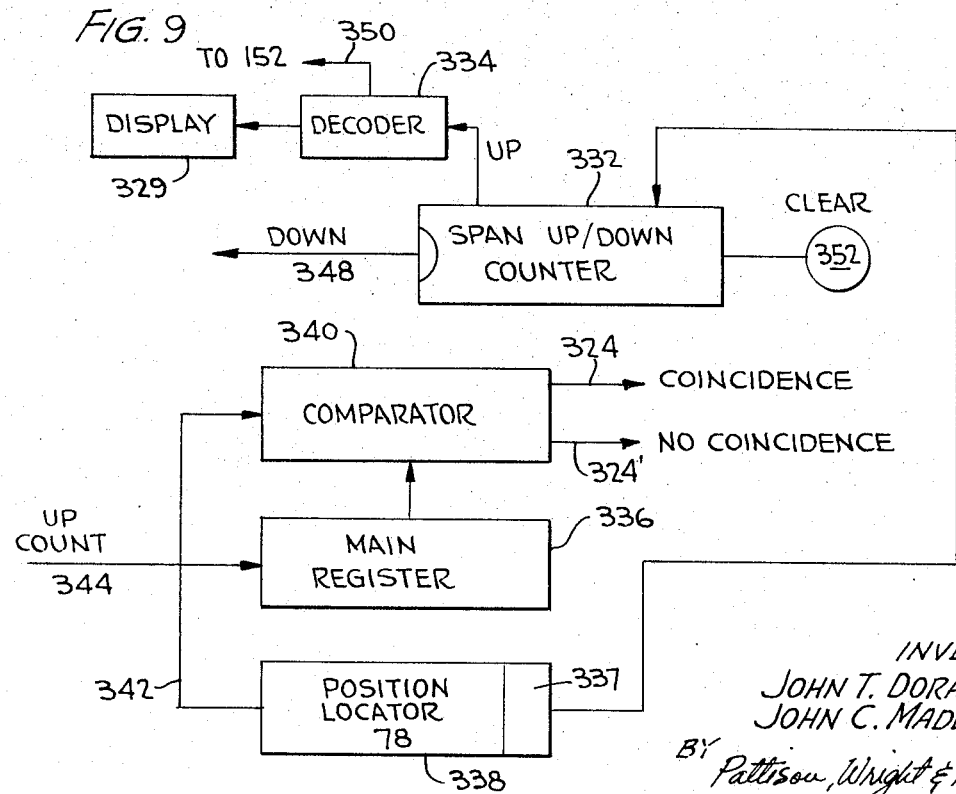

3,782,565

AUTOMATED HANDLING SYSTEM FOR CONTAINER HELD MATERIAL

FIELD OF THE INVENTION

The present invention relates to automated material retrieving devices and more particularly to a system having a movable bed. A logic control unit permits entry of a position therein. The logic control unit sends the bed to the selected position whereupon electromagnetic means mounted on the bed moves a rack stored container onto the bed which then returns to an initial station.

THE PRIOR ART

Automated retrieval and storage handling systems have been known for some time. With the advent of solid state logic circuitry, systems can be constructed to sense a particular container location and retrieve or return a container thereto from a movable bed.

In one prior art system, prefabricated racks and containers of the same size are employed to store parts in a warehouse. A cable drive connects a motor with a movable bed and control means cooperate with the bed to move the latter to a preselected container location. Photoelectric sensing is employed to detect the exact container placement. Pulse counters detect coincidence between preselected container location coordinates and the corresponding location in the rack.

Because this prior art system relies upon cable drive, it is not capable of handling relatively heavy loads. Further, the requirement that particular racks and single sized containers be used presents an economic burden to a potential user who finds it necessary to dismantle and remove his existing rack system.

The prior art system is able to operate along three axes. The X and Y axes represent vertical and horizontal coordinates in a particular rack. The Z-axis defines the direction between adjacent racks separated by an aisle. Thus, although the prior art system is able to retrieve and store containers across both sides of an aisle, the system requires the racks and containers to be identical in structure and mirror images as far as location is concerned.

SUMMARY OF THE INVENTION

The present invention is a storage and retrieval automated system incorporating a movable bed that is capable of operating along three axes. Material to be stored and retrieved is placed in containers or bins, the containers being stacked in a rack. A logic control unit is provided to allow the selection of a particular container location which permits the machine to move to the selected location and either retrieve or return a container thereat. Sensors are provided along the X and Y axes. The logic control unit counts the sensors along the X-axis until coincidence is detected with the preselected X coordinate. At the same time, this operation is performed with respect to the Y-axis. As a result of coincidence, the machine bed is positioned adjacent the proper container location. During retrieval, an electromagnetic means mounted on the bed is moved to magnetically engage a selected container. Then, the electromagnetic means pulls the container onto the bed. Once this is accomplished, the bed is moved to a station where the container can be removed. The reverse process is performed when a container is to be returned to its original location in the rack.

By placing racks in spaced relation to one another across an aisle, the bed is capable of selecting containers on either side of the aisle. This allows the bed to operate along a Z-axis in both directions.

The primary object of the present invention resides in the adaptability of the present automated system to existing rack installations.

A further object of the invention is to present an automated system capable of storing and retrieving differently sized containers or bins.

Still further, the present invention may operate with rack installations on opposite sides of an aisle without the requirement that the container locations on oppositely disposed racks be mirror images.

Yet another advantage of the present invention is derived from the mechanical drive employed. Rather than utilizing a cable drive, the present invention includes a heavy-duty rack and pinion drive. Accordingly, heavier loads can be handled than in systems employing cable drive.

Other objects, features and advantages will appear from the following more detailed description of illustrative embodiments of the invention, which will now be given in conjunction with the accompanying drawings.

BRIEF DESCRIPTION OF THE DRAWINGS

FIG. 1a is a partial sectional view of the system taken along section line 1a — 1a in FIG. 1 which illustrates means for securing a movable frame to a stationary rack system.

FIG. 1b is a partial section view taken along line 1b — 1b in FIG. 1 illustrating the means for mounting a load bed to a frame.

FIG. 8 is a timing diagram for the logic diagram of FIG. 7.

FIG. 9 is a block diagram of a Span system employed in the present invention.

DESCRIPTION OF THE INVENTION

Figure 1:
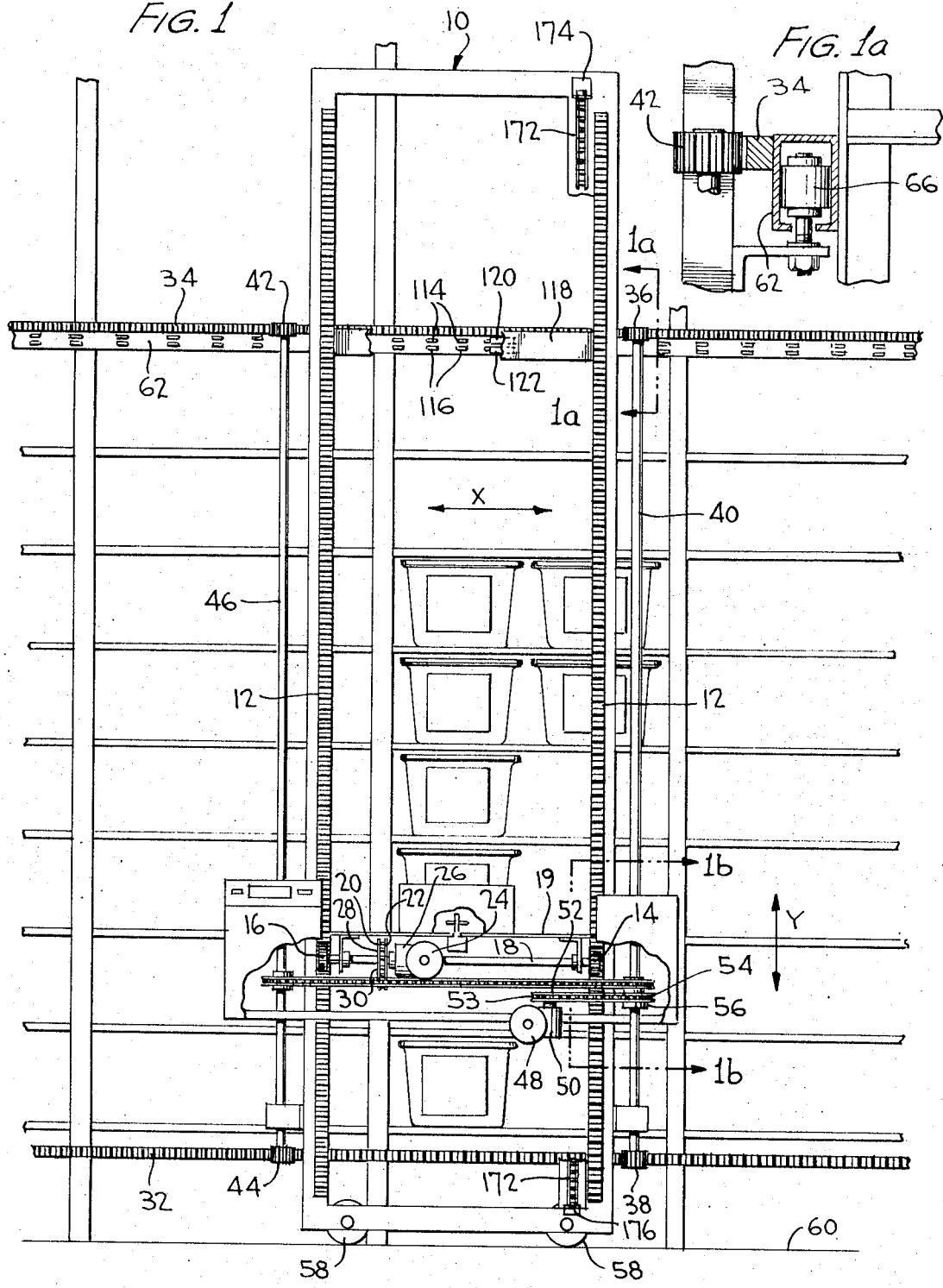
FIG. 1 is a front elevational view of the present system particularly illustrating the drive means for the system.

Referring to the figures and more particularly FIG. 1 THEREOF, THE MECHANICAL STRUCTURE OF A DRIVING MECHANISM IS ILLUSTRATED. This mechanism causes a loading platform or bed to become positioned adjacent a selected container that is stored in a rack. Reference numeral 10 generally indicates a rectangular open frame which serves as the central structural support for a bed or platform to be discussed hereinafter. The frame 10 is capable of horizontal movement to and fro along an X-axis.

In order to allow motion in the vertical direction or Y-axis, rack gears 12 are suitably attached to the vertical legs of the frame 10. These gears mesh with pinion gears 14 and 16 that are interconnected by a shaft 18. The loading bed or platform 19 is suitably journaled to the shaft 18 and rides along with it to a particular Y-coordinate. When the bed 19 is to assume a particular X-coordinate, the entire frame 10 moves in the horizontal direction until the X-coordinate is attained. Inasmuch as the bed 19 is mounted to the frame 10, the bed will likewise attain the X-coordinate. Once the preselected X and Y coordinates of the bed 19 result, the bed is at a preselected location with respect to a container thereby permitting the bed 19 to store or retrieve the container as explained in greater detail hereinafter.

In order to rotate the shaft 18 and cause commensurate motion of the pinion gears 14 and 16, a sprocket wheel 20 is mounted to the shaft 18 through a slip clutch 22. When the sprocket is caused to rotate, this will force linked rotation of the shaft 18 and the pinion gears 14 and 16.

The sprocket wheel 20 is caused to rotate by a transmission system including an electric motor 24 having its output shaft connected to a transmission box 26. The output shaft of the transmission box drives a sprocket wheel 28 that entrains a chain 30. The opposite end of chain 30 drives the sprocket wheel 20. The motor 24 is reversible thereby permitting both upward and downward movement of the bed 19 relative to the frame 10. The motor 24 and transmission box 26 are permanently mounted to the bed 19.

Similar drives exist adjacent the vertical legs of frame 10. More specifically, pinion gears 42 and 44 mesh with the rack gears 34 and 32, respectively. The shaft 46 is connected between the pinion gears 42 and 44 and is suitably journaled to the frame 10. Likewise, pinion gears 36 and 38 mesh with rack gears 34 and 32 respectively. An interconnecting shaft 40 is journaled to the frame. Shaft 40 drives the frame while shaft 46 serves as a driven member. When the shafts rotate, frame 10, journaled to the shaft, will undergo horizontal movement along the X-axis. A chain drive accomplishes this function. As will be seen in FIG. 1, a motor 48 attached to frame 10 has its output shaft driving a transmission box 50 which is likewise attached to frame 10. A sprocket wheel 52 is attached to the drive shaft of the transmission box 50 and entrains one end of a chain 53. The opposite end of the chain entrains a sprocket wheel 54 which is connected to shaft 40 through a slip clutch 56. Rollers 58 are mounted to the lower leg of frame 10 and are adapted to ride along track 60 which may be connected to the floor or a lower portion on a rack system.

A channel iron 62 is attached to a rack system and is positioned above rack gear 34, the channel iron 62 being parallel to the rack gear 34. Pinch rollers 64 and 66 are connected to the left and right vertical legs of frame 10, respectively. These pinch rollers engage channel iron 62 which is fixed to a rack system. The engagement between pinch rollers and the channel iron prevents the frame 10 from tipping forwardly.

Figure 2:
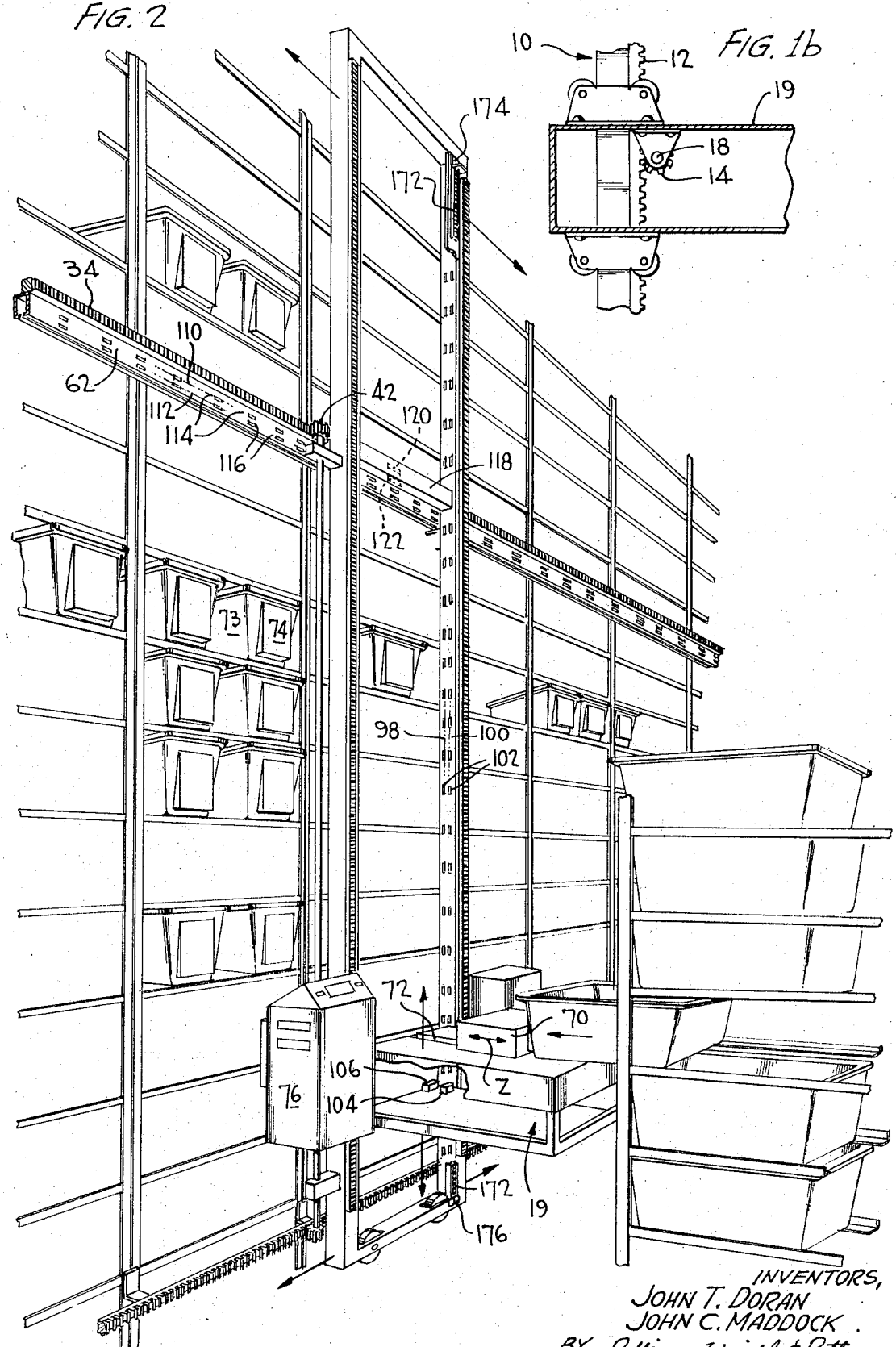
FIG. 2 is a perspective view of the present system when operating.

A view of the present system relative to a rack installation with containers or bins stored therein is illustrated in FIG. 2. The loading bed for retrieving and returning the containers to storage is generally indicated by reference numeral 19. An electromagnetic unit 70 is positioned on top of the bed 19 and is movable along a third orthogonal Z-axis. A slot track 72 is formed in the bed 19 to guide Z-axis displacement of the electromagnetic unit 70. The slot 72 extends along the entire Z dimension of the bed to permit the electromagnetic unit 70 to operate upon containers stored in racks on both sides of an aisle. The previously discussed motor 24 and transmission box 26 are mounted to the bed 19, under the electromagnetic unit 70. The previously discussed motor 48 and transmission box 50 are secured to the right vertical leg of the frame as illustrated in FIG. 2. A typical container 73 has a magnetic plate 74 suitably attached to an outward end thereof. It is the plate 74 which is attracted by the electromagnetic unit 70 after the bed 19 is positioned in line with the plate 74. Upon actuation of a control unit to be discussed hereinafter, the electromagnetic unit 70 moves along slot 72 until magnetic contact is made with the magnetic plate 74. Subsequent to the contact, the electromagnetic unit 70 draws the container 73 onto the bed 19. Afterwards, the frame supported bed 19 is returned to a home or original station. It should be explained that the X and Y coordinates of the bed are adjusted simultaneously. Therefore, as the bed moves along horizontally, it also undergoes vertical displacement until preselected coincidence occurs between the bed 19 and chosen X, Y coordinates. The bed 19 will then move to the chosen left or right side of an aisle (Z coordinate).

A control unit generally indicated by reference numeral 76 is permanently mounted to the frame and controls the entire operation of the system. As explained in greater depth hereinafter, thumb switches are provided to enter the location of a desired container. Thereafter, the control unit 76 initiates X and Y motion of the bed 19 until the bed becomes aligned with the location of a container that corresponds with the location entered with the thumb switches on control unit 76. Thereafter, the control unit 76 controls the motion of the electromagnetic unit 70 to effect retrieval-storage operation, the control unit 76 causes the frame supported bed 19 to return to a home station.

At this point, the basic mechanical operation of the system has been explained. Accordingly, the following discussion will concentrate upon the electrical portion of the system.

Figure 3:
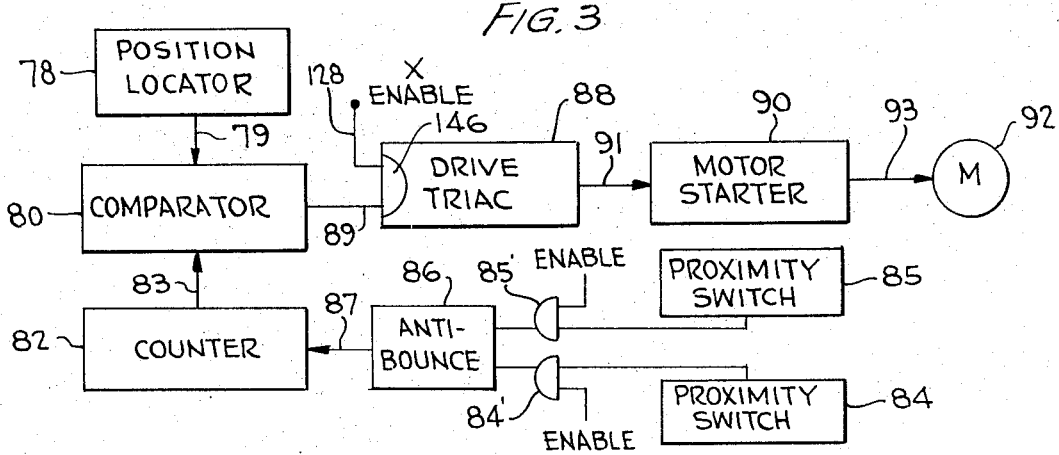
FIG. 3 is a block diagram of the electrical circuitry for locating the system relative to a desired container location.

FIG. 3 illustrates in block form the system portion that effects precision movement of the load bed between a home station and a particular container location.

In FIG. 3, a position locator in the form of a thumb wheel switch 78 is represented for manually entering a container position location. A decimal number is set which corresponds to XYZ coordinates of a selected container location. For example, the switch may be of the type manufactured by Chicago Dynamics Industry and identified as switch TL180-618. The output of position locator 78 is in the form of BCD (binary coded decimal). A connecting line 79 feeds the BCD output to a comparator 80. A counter 82 is stepped incrementally as the system moves along an axis. It should be emphasized that the system portion illustrated in FIG. 3 is duplicated for both the X and Y axis. However, for convenience, the system portion involved with only the X-axis will be explained. The counter 82 counts in BCD and is initially triggered by proximity switches 84 and 85. The proximity switches may be of any suitable conventional design. However, by way of example, the proximity switches may be of the magnetic sensing type which generates an electrical output as it is swept by a magnet. The output of the proximity switches 84 and 85 are fed into an anti-bounce circuit 86 which prevents spurious generation of signals from the proximity switches that might cause actuation of the counter 82. An output line 87 connects the anti-bounce circuit 86 to an input of the counter 82. Upon movement of the present system along incremental distances on the X-axis, electrical signals will be generated by the proximity switch 84 as incrementally spaced magnets on a rack system are passed. As will become later apparent, switches 84 and 85 are respectively associated with the left or right directions along the Z-axis. Thus, when for example the left side of an aisle is selected the output of switch 84 is transmitted to the anti-bounce circuit 86 because gate 84' is actuated. Similar enablement occurs for the switch 85 through gate 85' when the right side of the aisle is selected.

A chosen container location will have a preselected X coordinate. As the counter 82 increments upwardly, there will come a time when the count in the counter 82 will coincide with this desired X coordinate which has been set by the thumb wheel switch 78. The coincidence is detected by comparator 80. During periods when coincidence is not detected, the comparator 80 issues an output signal along lead 89 which feeds a drive TRIAC 88 or S.C.R. switch. The output of the TRIAC feeds a motor starter 90 via lead 91. The motor starter may be of the relay type enabling relatively small control currents to actuate a reversible motor 92 that is energized by the motor starter 90 via lead 93. When coincidence is detected by the comparator 80, energization of TRIAC 88 ceases thereby causing the motor 92 to stop.

Referring to FIG. 2, permanent magnets 102 are mounted along the strips 98 and 100 in parallel relation. The magnets along each strip actuate a corresponding proximity switch 84 or 85. It is to be noted here that the magnets 102 are stationarily mounted with respect to frame 10 and are adapted to detect motion of bed 19 in the vertical direction (along the Y-axis). The proximity switches 84, 85 for detecting bed displacement in this direction would be mounted at points 104 and 106 thereby securing the proximity switches to the bed and in proximity with the magnets 102 when the bed moves vertically upwardly on the frame 10 past the magnets 102.

A similar structure is involved in detecting passage of frame 10 along the horizontal or X-axis. Thus, vertically spaced parallel strips 110 and 112 are fastened to channel iron 62. Spaced permanent magnets 114 and 116 are secured to the strips 110 and 112, respectively. A bar 118 is horizontally positioned between the vertical legs of frame 10. Spring loaded, free floating proximity switches 120 and 122 correspond to the proximity switches 84 and 85 shown in FIG. 3 previously explained in connection with X-axis operation. The switches 120 and 122 will be selectively operated depending upon which side of an aisle (Z-axis) the system is to operate along.

Figure 4:
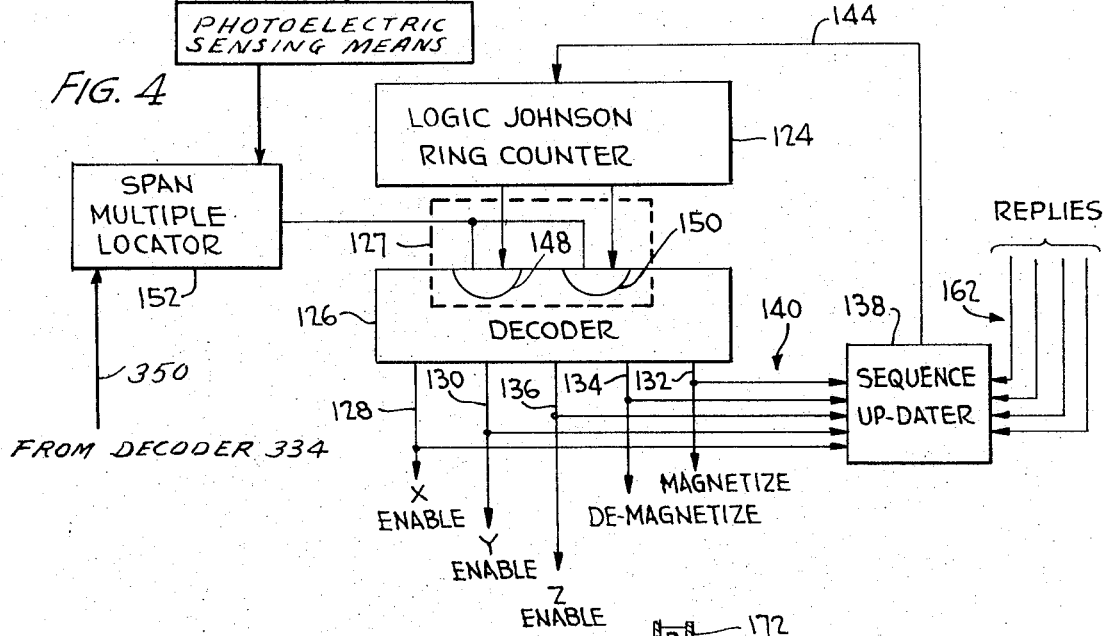
FIG. 4 is a block diagram of the logic control circuitry for the system.

FIG. 4 indicates in block form the circuitry which functions as a logic controller or operation sequencer. Referring to the figure, a counter 124 is provided. This counter may for example be a Logic Johnson Ring Counter. The output of the ring counter includes a plurality of leads which drive a decoder 126 through gate circuitry 127 to be elaborated upon hereinafter. The decoder is of a conventional logic type which is capable of generating unique operation codes along its output lines. A first output line 128 is an X-Enable which is employed as an input to a gate 146 (FIG. 3) that serves to control, along with comparator 80, actuation of the drive TRIAC 88. If the control circuitry of FIG. 3 were used to drive the system in the vertical direction (Y-axis), a Y-Enable would be substituted for the X-Enable. The Y-Enable line is indicated by reference numeral 130 in FIG. 4. A third output line 136 carries a Z-Enable which is generated to selectively enable gates 84' or 85' of FIG. 3. This, as previously mentioned, will determine which side of an aisle (Z-axis) the system will operate upon.

As previously explained, and as will be appreciated by viewing FIG. 2, after the load bed 19 rests before a selected container, the electromagnetic unit is moved from its central position on the bed toward the rack system. During retrieval, the electromagnetic unit 70 becomes magnetized as it moves toward engagement with a selected container. This action of the electromagnetic unit is controlled by the magnetizing control line 132 (FIG. 4). An additional output line of the decoder is referenced by 134 and carries a demagnetizing control signal. In a retrieval situation, after the electromagnetic unit 70 has engaged a pre-selected container and pulls it onto the bed under the force of magnetic action, the electromagnetic unit 70 becomes demagnetized after a control signal on line 134 appears. Each of the output control lines 128, 130, 132, 134 and 136 are connected in parallel by transmission lines 140 to a sequence updater 138. Reply lines 142 are connected to comparator 80 (FIG. 3) for the X-axis and to a similar comparator for the Y-axis. When there is coincidence of signals on reply lines 142 and transmission lines 140, the sequence updater 138 generates a signal 144 which is fed back to the Logic Johnson Ring Counter 124, in closed loop fashion, to update the counter. By way of explanation, the ring counter 124 maintains unique states because each time the counter progresses, a 0 is counted out each time a 1 is counted in.

Referring in FIG. 4 to the gating circuitry 127, it will be observed that the ring counter 124 has True and Compliment lines respectively feeding gates 148 and 150. Each of these gates is connected to an enabling circuit referred to as a span multiple locating circuit 152, to be explained hereinafter. However, it should suffice at this point to indicate that the ring circuit 124 drives the decoder 126 incrementally to perform X-Enable, Y-Enable, Z-Enable, Magnetize and Demagnetize.

Returning to the span multiple location circuit 152 (FIG. 4), this circuitry is adapted to permit the load bed to move to a second selected container position if photo-electric sensing means 153 (FIG. 4) indicate the absence of a container at the first selected container position. In operation of the present system, when the True line is enabled through gate 148, the decoder functions to initiate movement of the load bed to a first selected position. When the absence of a container at that position becomes manifest, the Compliment line becomes enabled through gate 150 thereby indicating to the system that a Span operation is to commence by renewing energization of the X-axis motor which initiates a new retrieval cycle. The span circuit 152 controls the selection of either gate 148 or 150. In actual practice, the load bed will move to the next container location on the X-axis, if an appropriate thumb wheel switch is actuated in the ring counter 124. Again, this occurs when the compliment of the counter 124 is read into the decoder 126.

Figure 5:
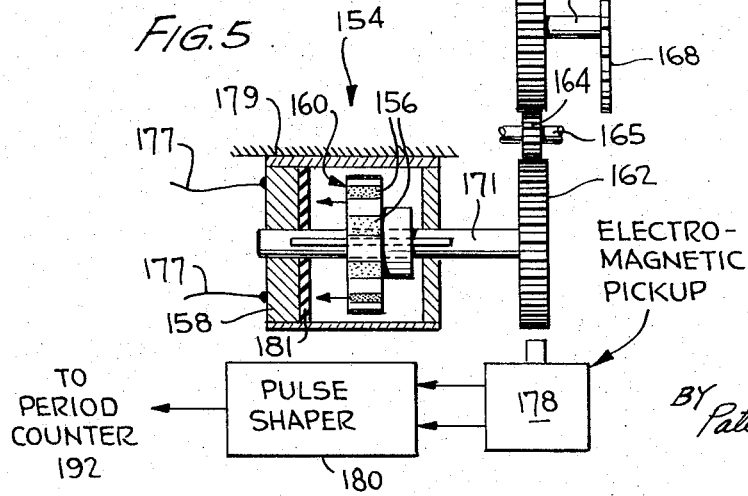
FIG. 5 is a sectional view illustrating a fail-safe braking device.

FIG. 5 represents a fail-safe system for preventing the load bed from descending rapidly in the event power failure occurs.

Referring to FIG. 5, a permanent magnetic cyclinder is indicated by 154. At one end of the cylinder is a brake plate 160 that is rotatable with respect to the central cylindrical portion. The brake plate 160 comprises a number of pie-shaped ferro-magnetic strips 156. An electromagnet 158 is mounted within the cylindrical structure 154. This electromagnet serves as a bucking magnet to defeat the normally existing holding or braking power of the permanent magnet brake plate 160. To fully appreciate the fail-safe brake, consider the relatively large gear 162 connected to shaft 171, the left end of the shaft being fixed to the brake plate 160. The large gear 162 meshes with a smaller gear 164 that is mounted on its own axis 165. The small gear 164 in turn meshes with a relatively larger gear 166 that is in turn secured to an axially fixed shaft 170. The outer end of shaft 170 securely mounts a sprocket wheel 168 that engages a sprocket chain 172. The chain extends vertically along the right leg of frame 10 as shown in FIG. 2. The upper end of the chain is fixed at point 174 to the top of the frame 10 while the lower end 176 of the chain is fixed to a lower point on the frame 10. During normal operation of the device, the electromagnet 158 is energized on lines 177 by circuitry to be discussed hereinafter. Energization of this electromagnet presents a bucking magnetic field which defeats the magnetic action of the brake plate 160 relative to the cylindrical body 154 which is attached to the bed as indicated by 179. This permits rotation of the brake plate 160 and commensurate rotation of shaft 171 which in turn allows rotational operation of the gear train 162, 164, 166, 168 and the chain 172. However, in the event there is a failure followed by rapid load bed descent, the energization of lines 177 terminates thereby terminating energization of the electromagnet 158. When this occurs, the brake plate 160 has complete dominance and causes magnetic attraction of the plate 160 toward the cylindrical body 154 followed by frictional engagement with an internal friction plate 181 which results in rotational termination of the brake plate 160. Inasmuch as the previously discussed gear train is linked with the brake plate 160 through its shaft 171, this gear train likewise ceases to rotate. As a result, there is no further motion between the sprocket wheel 168 and the chain 172. Accordingly, the cylindrical body 154 remains vertically stationary. Because the cylindrical body 154 is attached to the load bed at 179, the load bed likewise remains vertically stationary thereby preventing descent of the load bed during a power failure.

In order to appreciate the generation of control signals on lines 177, further reference is made to FIG. 5 wherein an electromagnetic pickup 178 is illustrated in proximity with the gear teeth on the gear 162. The electromagnetic pickup 178 senses the traversal of gear teeth thereacross and generates a pulse train corresponding to the passage of gear teeth across the pickup. The pulse train is fed from the pickup 178 to a pulse shaper 180.

Figure 6:
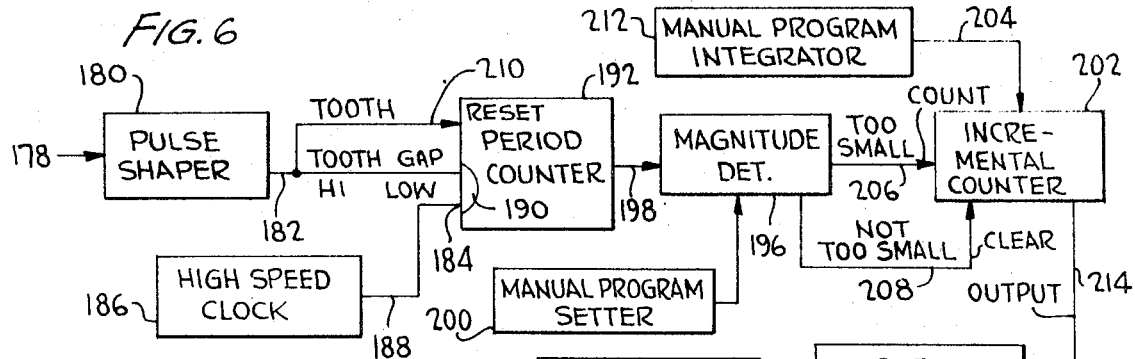
FIG. 6 is a block diagram of the circuitry for actuating the fail-safe braking device.
Figure 6A:
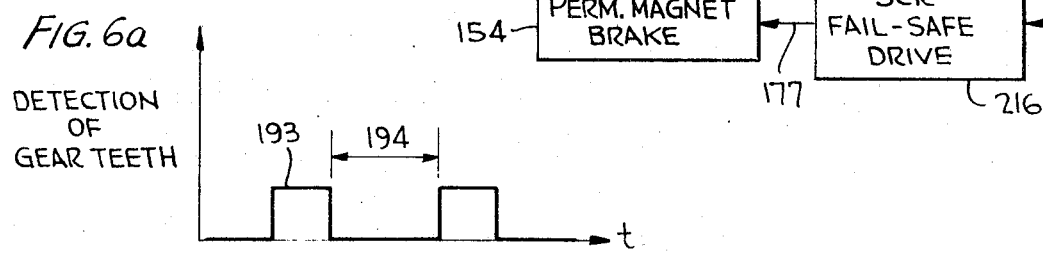
FIG. 6a is a time diagram of the signal generated from an electromagnetic pick up component of the fail-safe circuitry.

The transmission of electrical signals from the pulse shaper 180 is illustrated in FIG. 6. As indicated in this figure, the pulse shaper generates a pulse train that is carried by output line 182 to a gate 190. The gate is periodically enabled at input 184 by a high speed clock 186 having its output line 188 connected to the enable terminal 184 of the gate 190. Gate 190 becomes actuated during the interval between pulses 193 as shown in FIG. 6a. This interval is defined as 194. Actuation of the gate 190 causes the period counter 192 to incrementally count during the interval 194. The output 198 of the period counter feeds a magnitude detector 196. The detector is in essence an integrating circuit which produces a value dependent upon the interval or space 194. The magnitude detector generates two output signals indicating whether a manually set threshold has been detected. This threshold is set by a manual program setter 200 which may be a potentiometer capable of varying the minimum interval 194 for which the magnitude detector 196 will respond. An incremental counter 202 receives transmission from the magnitude detector 196. If the manually programmed threshold for the magnitude detector is not exceeded by the period counter 192, a control signal is fed along line 206 from the magnitude detector 196 to the incremental counter 202 thereby indicating that the count received from the period counter 192 is less than the threshold. In this event, line 206 is fed to a count terminal of the incremental counter which causes this counter 202 to conduct counting. The compliment of this condition becomes manifest by a lead 208 which connects the output of the magnitude detector 196 with a reset terminal of the incremental counter. Thus, when the period counter 192 informs the magnitude detector 196 that the interval 194 (FIG. 6a) is not too small, the incremental counter 202 becomes reset.

The purpose of the incremental counter 202 is to accumulate a count for sequential intervals 194 that do not exceed the preselected threshold as set in by the manual program setter 200. When the interval 194 is below the threshold, this indicates that the teeth on gear 162 (FIG. 5) are accelerating in their rotation. This indicates a runaway condition in the Y-axis movement of the load bed.

A manually programmed integrator 212 allows the presetting of a count in the incremental counter 202 that corresponds to this runaway or unsafe condition. The integrator 212 may for example be a conventional comparator which monitors the count in the counter 202 through an interconnecting lead 204. When the selected count is reached, the comparator issues a recognition signal to the incremental counter 202 which thereafter generates an alarm signal on output lead 214 which drives an SCR fail-safe drive 216. The output of this drive appears on transmission leads 177 that have been previously illustrated in FIG. 5 as the leads connected to a bucking electromagnet 158. In normal operation of the device, the SCR 216 energizes the bucking electromagnet 158 therefor permitting free Y-axis motion of the load bed. However, upon the generation of an alarm signal on lead 214, the transmission lines 177 cease to carry an energizing signal due to a change of state in the SCR drive 216. As a result, the permanent magnetic brake 154 is actuated to a braking condition thereby preventing descent of the load bed.

Figure 7:
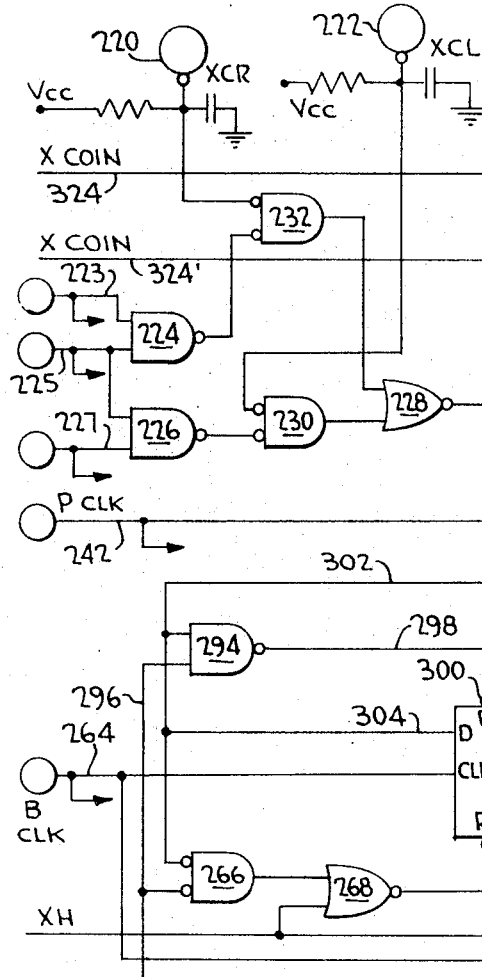
FIG. 7 is a logic diagram of an anti-bounce circuit used in the present invention.

With reference to FIG. 7, reference will be made to anti-bounce circuit operation along the X-axis as briefly mentioned earlier in relation to 86 of FIG. 3. As will be appreciated, identical circuitry will exist for system operation along the Y-axis.

Each time a container is to be stored or retrieved, the manual entry made in position locator 78 (FIG. 3) contains an indication as to whether the container is to be retrieved or stored on the Right or Left side of an aisle. Referring for the moment to FIG. 3, proximity switches 84 and 85 would generate outputs each time a particular proximity switch senses an associated permanent magnet along the X-axis. The output from these switches correspond to circuit input terminals 220 and 222. 220 represents the X-axis for counts in the Right direction whereas 222 represents X-axis counts in the Left direction. Gate 224 performs an AND function for an input 223, this input being energized when the position locator 78 is commanded to store or retrieve a container from a location on the Right side of an aisle. As previously discussed in connection with FIG. 4, the decoder 126 issues an X-Enable signal at a proper moment during an operation cycle. This command signal is carried by lead 225. When signals are present on lines 223 and 225, gate 224 performs an AND function and generates an output signal which is fed to an input of gate 232. An AND function is completed when the X count Right appears at terminal 220. The output from gate 232 is fed to an input terminal of gate 228. A second gate 226 has a first input thereof connected to the count enable line 225. A second terminal of gate 226 is connected to a lead 227 that carries a control signal thereon when the position locator 78 has been instructed to store or retrieve a container from the Left side of an aisle. The inputs on lines 225 and 227 are fed to gate 226 and an AND function is performed wherein coincidence of input signals causes an output signal to be transferred to gate 230. When an X count Left signal appears at terminal 222, the gate 230 generates an output signal which is communicated to the previously mentioned gate 228.

The gate 228 will generate an output signal immediately upon proximity switch closure associated with either side of an aisle. The output from gate 228 which performs an OR function feeds an inverter 234 which in turn drives an edge triggered flip-flop 236 by applying a signal at the input terminal 235. Thus, this first switch closure is stored in the flip-flop, the output terminal 237 of the flip-flop goes low and steers the edge blockout flip-flop 238 via gate 240. Further operation of the gate 240 will be discussed in greater detail hereinafter. A propagation clockline 242 is provided as an input to the edge lockout flip-flop 238 along input lead 248. The propagation clock signal on 242 is out of synchronization with the signal appearing at the other input terminal 249 connected to the gate 240. The propagation clock signals on 242 clock whatever is steered into the lock out flip-flop 238. Thereafter, the output terminal 244 of the edge lock out flip-flop 238 goes low. This output is coupled through lead 246 back to the second terminal of gate 240. The reason for this is that the edge lock out flip-flop 238 must reset the edge detector flip-flop 236. If the steering gate 240 is not held, the next input to the edge lock out flip-flop 238 will reset it.

When the binary state on the propagation clock line 242 changes, gate 250 performs an AND function. The signal is generated at the output of gate 250 which is transmitted along lead 252 to gate 256. An OR function is performed by this gate thereby generating an output signal on lead 258 which resets the edge detector flip-flop 236. This causes a change in the state at output line 237 of the flip-flop 236 and removes the holding input on gate 240.

As will be appreciated, the primary function of the just discussed circuitry is to recognize an initial proximity switch closure by detecting the leading edge of the first switch closure. Trailing edges and other spurious leading edges are disregarded by virtue of the discussed holding action by gate 240 in conjunction with flip-flops 236 and 238. This holding or locking out of pulse edges other than the first leading edge (original switch closure) terminates when the proximity switches cease to generate output signals for a short period of time indicating that bouncing has stopped. Thereafter, in an identical fashion, switch closure will be recognized by detection of the first leading edge by flip-flop 236. All other trailing edges of switch signals produced by bouncing are eliminated by the edge lockout flip-flop 238.

Simultaneous with the clocking of flip-flop 236, a third flip-flop 262 has a clock signal applied thereto along lead 264. As will be discussed hereinafter, the purpose of this flip-flop in conjunction with other circuitry is to recognize the bounce occurring at the leading edge of the proximity switch closure. The signal appearing on lead 302 steers the flip-flop 262. The clock signal on lead 264 is characterized as a bounce clock signal. The period of the bounce clock signal is preselected to be slightly less than the period of an average bounce signal. At any time the input proximity switch lines become actuated at 220 or 222, and the bounce clock signal is set high, the flip-flop 262 is set. Not only is the flip-flop 262 steered by a switch closure, the gate 266 feeds gate 268 which causes reset of the flip-flop 262. Thus, if a proximity switch gives a temporary closure, and is followed by an opening of the switch, there will be a DC reset of flip-flop 262 if a signal on the bounce clock line 264 is coincident therewith. However, finally an activated proximity switch will settle down and there will be present a high steering input, and a bounce clock signal comes along on lead 264, the switch closure will not cause the flip-flop 262 to be reset. As this occurs, the bouncing clock signal at lead 264 presents itself along connecting lead 274 to a gate 272. With flip-flop 262 set from switch closure coincident with a bounce clock signal on 264, the flip-flop output 262 will be low on lead 276. This occurrence permits a first input terminal of gate 272 to be enabled by a lead 276.

The occurrence of a clock signal on line 264 enables the second terminal of gate 272 via lead 274. The output from gate 272 goes high and sets the flip-flop 286 comprising gates 280 and 288. As will be seen from FIG. 7, the high output on lead 278 feeds one terminal of gate 280. It is noted that the flip-flop 286 functions as another lock out flip-flop. With the flip-flop 286 being set, a true output is derived along lead 282. This line goes low and presents a low signal to the input terminal 287 of the edge detector flip-flop 236. The output of gate 288 goes high when the flip-flop 286 is set. The output line of gate 288 being high goes through an OR gate 290 which causes the DC reset of the edge lock out flip-flop 238 via connecting lead 292. This removes the DC reset from flip-flop 236. Thus, the flip-flop 236 can be held in a reset condition by inhibiting terminal 287. The output terminal 284 of flip-flop 286 is connected to a lead 314 which transmits the output from terminal 284 to the reset terminal of flip-flop 262 via gates 266 and 268. This inhibits the count switch opening from resetting the lock out flip-flop 262. Otherwise stated the reset path to flip-flop 262 which includes gates 266 and 268 is inhibited. At the same time, the input of gate 294 is steered via lead 296. The output line 298 of gate 294 feeds directly to a preset input terminal 300 of the flip-flop 262. This means that if an input count switch is closed, gate 294 has two high inputs, it is enabled thereby presetting flip-flop 262 along line 298, at the preset terminal 300. Thus far, the circuitry has functioned to recognize a switch closure; storage of the leading edge; lock out of other pulse edges; recognizing the finishing of bouncing of the initial leading edge and cessation of bouncing. At this point, the steering in the anti-bounce circuitry is turned around so that the circuitry is prepared to detect a clean opening of the switch. When a proximity switch first opens, gate 294 is inhibited because its input along line 302 goes low therefore inhibiting the gate 294 from presetting the flip-flop 262 at terminal 300. However, the input of flip-flop 262 along line 304 is steered. Any spurious operation of a proximity switch will be recognized as a high output along line 302. If this happens again, the flip-flop 262 is preset. If however, the proximity switch as detected at line 302 remains low, long enough for the clock on line 264 to clock flip-flop 262 low, and for the proximity switch to remain open long enough for the output of the flip-flop 262 (which has a low output on line 306) coincidence can be effected at gate 308 fed with a clock signal via lead 274. When this coincidence occurs, an output is generated on line 310 thereby presenting an input to gate 288 which resets the flip-flop 286. The output 284 changes to a low state and resets the entire circuitry to its original state. At this point, the circuitry is armed to detect the leading edge of another switch closure. More precisely, this occurs when the low output on lead 312 is present thereby removing the reset hold on flip-flop 238 through the gated path including gate 290 and lead 292.

The change along lead 314 is also used to enable gate 266 while inhibiting gate 294. The output of gate 280 if carried by lead 282 reverts to its high state. It being high returns high steering at the original flip-flop 236 so that it is prepared to recognize the next leading edge at a switch closure.

The output of flip-flop 286 is presented along lead 316 to a lamp driver 318 which in turn drives a lamp terminal 321. A resistor 320 is connected between the terminal 321 and ground. The purpose of this resistor is to limit surge currents which would otherwise injure driver 318 due to the cold filament of a lamp connected to terminal 321.

Each time the flip-flop 236 is set, an output signal is presented to a first terminal of gate 322. The second terminal of this gate is connected through lead 324 to a control signal representing the absence of coincidence between the selected X coordinate and the instantaneous X coordinate of the machine. The control signal indicating the lack of X coincidence is derived from the comparator 80 shown in FIG. 3. The output from gate 322 is carried by lead 328 which generates an up count signal to the counter 82 shown in FIG. 3. The output lead 326 of flip-flop 236 is connected in parallel with an input terminal to gate 346. The second terminal of this gate is connected to a control line 324' which becomes energized when coincidence does exist between the selected X coordinate as set in the position locator 78 (FIG. 3) and the instantaneous position of the load bed. When gate 346 is actuated by virtue of X coordinate coincidence, a signal appears on output line 348 to present a down count for counter 82 (FIG. 3). When this coincidence occurs, gate 322 is inhibited.

FIG. 8 illustrates timing diagrams plotted for critical points in the circuit of FIG. 7. The first wave form illustrates electrical signals derived from switch closures as presented on line 302 in FIG. 7.

The second timing diagram indicates the output signals on line 326 (FIG. 7) from flip-flop 236.

The third timing diagram indicates a pulse train which represents the propagation clock signal along line 242.

The fourth timing diagram represents the inverse of the signal appearing on line 244 which is connected to the edge lock out flip-flop 238. During the width of the pulse shown in the fourth timing diagram, the edge detecting flip-flop 236 is disarmed. Actually, it is this pulse width which sets the minimum width for the output of edge detector 236 (at line 326).

The fifth timing diagram indicates the pulse train that is the bounce clock signal at line 264.

The sixth timing diagram represents the output of flip-flop 262, along lead 306.

The seventh timing diagram represents the output from flip-flop 286 along line 312. The width of the pulse indicated in this timing diagram disarms the edge detector flip-flop 236.

FIG. 9 illustrates a block diagram for the multiple location Span feature of the present invention. With regard to FIG. 4, the previous discussion mentioned the function of the Span circuitry 152. To briefly review, the Span circuitry maximizes the efficiency of the machine. During a retrieval process, if the load bed is directed to a first location and that location is empty, the Span circuitry automatically directs the load bed to move to an adjacent location for retrieval of a container which would contain the same material as the originally selected container. In the event the second location is also empty, the Span circuitry could repeat the process thereby moving the load bed to a third location, and so on. A similar operation would take place during storage. Thus, if a first location is chosen for return of a container, and that position is found to already house a container, the Span circuitry can come into play and cause the load bed to move to an adjacent location where the procedure is repeated until an available location is found.

Returning to FIG. 9, the particular block circuitry of the Span system is illustrated. Considering this system in detail, reference is made to FIG. 9 wherein the position locator 78, previously discussed in connection with FIG. 3, is illustrated. Actually, the position locator includes a compartment location switch entry 338 and a separate entry 337 that dictates the extent to which the system of FIG. 9 will span multiple locations. To be more explicit, the switch output from locator portion 337 forms an up count switch input to an up-down counter 332. This counter will finally assume the count that is entered in the position locator section 337. If, by way of example, the counter 332 stores the count equivalent to two, this means that when the load bed of the machine comes to an original location as specified by position locator section 338, if there is no container present thereat, the system will make two additional attempts to find a container at adjacent locations.

In sequence, the original location of a container as entered in position locator section 338 will provide a first input to a comparator 340 via lead 342. A main storage register 336 is sequentially triggered with up counts from lead 344 which corresponds to line 328 of the anti-bounce circuitry of FIG. 7. The main register serves as a count accumulator and when there is coincidence between the count in the main register 336 and the selected location as entered in the position locator 78, the load bed has come to its original selected position. The comparator 340 has two outputs. The first output 324 carries a signal when coincidence is reached. The line 324' carries a signal indicating lack of coincidence. As mentioned in the previous discussion of the anti-bounce circuit (FIG. 7) when coincidence occurs, up count is inhibited. However, under such circumstances a down count along lead 348 can be obtained from gate 346 (FIG. 7).

Assuming a load bed comes to rest at the original selected location, and no container is present for retrieval, photoelectric means 153 (FIG. 4) alert the system to this fact. A decoder 334 is intermediately connected between the counter 332 and a display 329. The display 329 indicates visually the condition of counter 332. Also, an output line 350 provides information to the circuitry of FIG. 4 (at 152) to condition the circuitry of FIG. 4 for performing a span operation. This means, that if the machine is to span an adjacent location along the X-axis, the presence of a number other than 0 in the decoder 334 provides information for the circuitry of FIG. 4 thereby causing this circuitry to initiate motor operation of the system to an adjacent location on the X-axis. Each time the load bed is moved to an adjacent location from the previously attempted location, the counter 332 will be counted down until the decoder 334 recognizes the presence of a 0 count in the counter 332. At this time, the circuitry of FIG. 4 will operate to return the machine to its home station. If the operation is to be stopped in the middle of a span procedure, a clear switch 352 is provided to reset the counter 332 to 0.

The display 329 provides valuable information to personnel. For example, if an entry is made in position locator 78 directing the Span circuitry to search three additional locations other than the originally selected one, should a container be absent in the original location, the display 329 will indicate how many additional locations (up to 3) had to be attempted before a container was found. This gives personnel valuable information as to how many of the three alternate (span) positions still house containers. Accordingly, without having to manually check the presence of containers in these alternate locations, personnel have the opportunity for checking inventory in this manner.

A number of safety devices lend themselves to the present invention. For example, photoelectric devices 153 (FIG. 3) are be employed to detect either the absence or presence of a container in a particular rack location. Thus, during a storage operation, should a container be in a selected position, a photoelectric detector can provide this information and preclude the possibility of crushing an unloading container into an occupied location. Similarly, lost motion can be prevented by detecting the absence of a container in a location that has been selected. This obviates the necessity for the electromagnetic unit 70 (FIG. 2) from moving toward engagement with an absent container.

Another safeguard is a photoelectric sensing device for detecting the actual presence of a container on the load bed. Thus, during a storing operation, if an operator has forgotten to place a container on the load bed, the machine will not go through a wasted operational cycle. Likewise, if a retrieval operation is to be performed, the photoelectric device can insure that the load bed is free of another container.

It should be emphasized that although electromagnetic attraction of containers is used to manipulate the containers on and off the bed, it is equally desirable to substitute a movable fork member for the electromagnet so that pallets can be manipulated as the containers.

It should be understood that the invention is not limited to the exact details of construction shown and described herein for obvious modifications will occur to persons skilled in the art.

What we claim is:

1. In an automated material storage and retrieval system which includes a rack assembly, a frame movably mounted to said rack assembly for permitting horizontal movement thereof, a load bed vertically movable on the frame, the combined movements of the frame and load bed effecting displacement of the load bed to a preselected location on said rack assembly and load handling means mounted on the load bed for transferring loads relative to the load bed, further wherein drive means are provided to render the horizontal and vertical movements, a condition response apparatus for determining load bed location comprising:

a control unit mounted on said frame;

position indicator means mounted to the rack assembly for indicating horizontal and vertical position locations on the rack assembly;

means mounted on said movable frame and operatively associated with said position indicator means for sensing horizontal and vertical movement of the frame and load bed relative to the rack assembly and generating a plurality of discrete signals as a result thereof to control said drive means;

means connected to the sensing means for selecting and verifying preselected one of said signals generated therefrom to control said drive means to position said frame at a preselected location on said rack assembly;

said control unit including means for entering a span count and for also preselecting a load transfer operation at a preselected storage location;

comparison means with inputs connected to the entering means and the selecting and verifying means for energizing the drive means until the load bed arrives at the preselected location;

means with an output for determining if the preselected transfer operation can be performed at the preselected locations;

span means connected to the output of said determining means for actuating the drive means to effect movement of the load bed only to a predetermined number of successive immediate adjacent predetermined locations relative to said first preselected storage location in the event that the preselected transfer operation cannot be performed at the first preselected location;

numerical counter means with an output connected to the span means for limiting and controlling, to the span count, the number of successive attempts made at said immediate adjacent predetermined locations by the span means in an effort to perform the first preselected load transfer operation.

2. The subject matter recited in claim 1 together with display means connected in circuit with the output of the counter means for visually displaying the count in the counter means thus informing an operator as to the number of times the system had to make alternate attempts at completing the selected transfer operation.

* * * * *